July 9, 1946.  C. G. MUENCH  2,403,740
APPARATUS FOR SEPARATING SHOT PARTICLES FROM MINERAL WOOL
Filed Dec. 31, 1942  2 Sheets-Sheet 1

C. G. Muench
Inventor
by Edw. A. Hampson
Attorney

July 9, 1946.  C. G. MUENCH  2,403,740
APPARATUS FOR SEPARATING SHOT PARTICLES FROM MINERAL WOOL
Filed Dec. 31, 1942  2 Sheets—Sheet 2
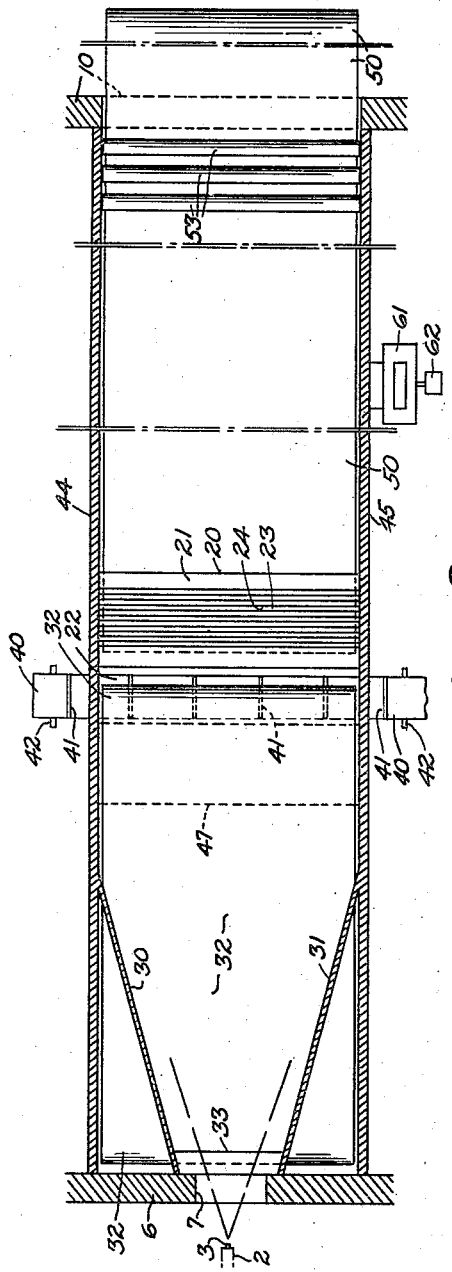
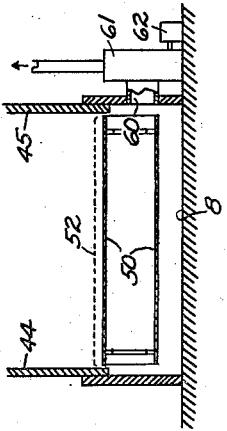
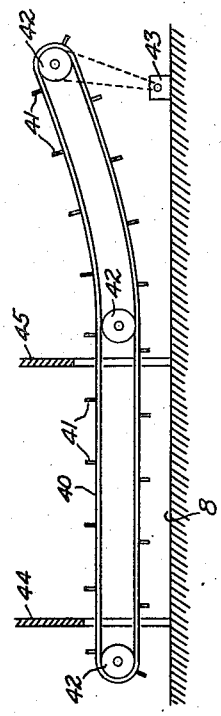
C. G. Muench
Inventor
by Edw. A. Hampson
Attorney Patented July 9, 1946

2,403,740

UNITED STATES PATENT OFFICE 2,403,740

APPARATUS FOR SEPARATING SHOT PARTICLES FROM MINERAL WOOL

Carl G. Muench, Wilmette, Ill., assignor to The Celotex Corporation, Chicago, Ill., a corporation of Delaware Application December 31, 1942, Serial No. 470,905

6 Claims. (Cl. 83—91)

This invention relates to apparatus for the separation of fibers from unfiberized particles and more particularly to apparatus for the separation of shot particles from mineral wool material, which apparatus is more efficient in operation than those heretofore proposed.

With these and other objects in view, the invention resides in the novel details of construction constituting the apparatus, as will be disclosed more fully hereinafter and particularly covered by the claims.

Referring to the accompanying drawings forming a part of this specification and in which like numerals designate like parts in all the views, Fig. 1 is a diagrammatic representation in substantial central vertical longitudinal cross-section of an apparatus for carrying out this invention;

Fig. 2 is a diagrammatic representation in substantial horizontal cross-section of the apparatus illustrated in Fig. 1;

Fig. 3 is a diagrammatic illustration taken transversely of the apparatus in order to illustrate a means for removal of the shot particles from the apparatus; and Fig. 4 is a diagrammatic illustration taken transversely of the apparatus in order to illustrate the fiber removal conveyor and the means for exhausting air or gaseous medium from the fiber recovery chamber.

Figure 1:
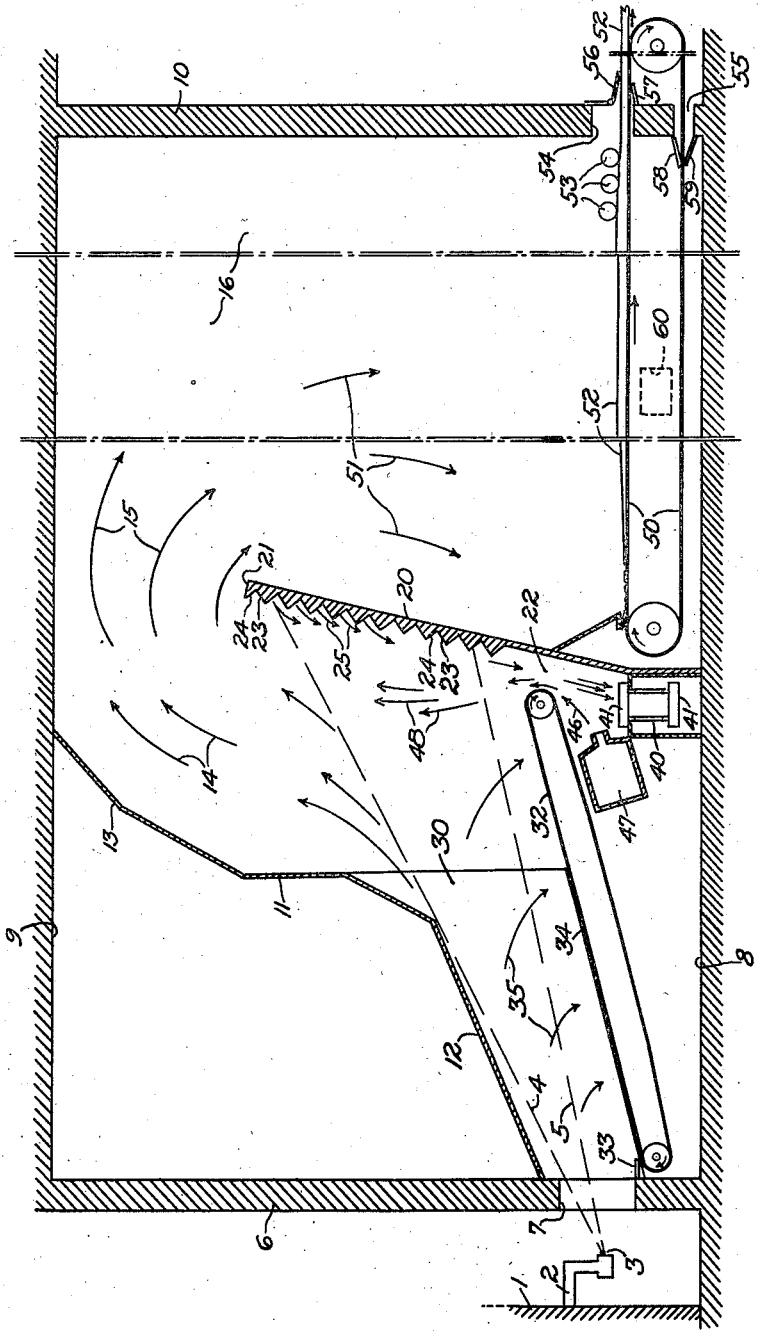

This invention is illustrated in the drawings with reference to the separation of mineral wool shot from mineral fibers, but this is only as an example of the invention since it is obvious that the invention in its broader aspect is applicable to the separation of heavier particles from lighter particles where such particles are initially suspended in a stream of a gaseous medium and projected by such stream into a suitable apparatus where the separation of the heavier particles from the lighter particles will be effected. Therefore, in the following description reference will be made to the treatment of mineral wool as produced from molten mineral wool material such as slag from a blast furnace, crucible or other similar apparatus, as one example of carrying out the invention.

In the manufacture of mineral wool from molten slag, etc., the molten slag is subjected to a jet of gaseous medium such as steam or air under high pressure, with the result that the molten slag is subdivided to form the mineral wool fibers which are relatively long hair-like formations which may have a globule of the molten slag attached thereto at one end thereof and which therefore are unfiberized particles as distinguished from the hair-like fiber particles and which globules have a greater mass and hence are heavier than the fiber particles. Also, the molten slag may be subdivided by the jet of gaseous medium into independent fibers and globules, that is the fibers and the globules may be independent of each other in that they are not attached to each other. Thus it will be understood that such slag subdivision results in independent fibers and globules, as well as in globules having the hair-like fibers attached thereto as attenuated tails but, because the presence of such globules in resultant mineral wool insulation is undesirable, efforts have been made to separate such globules or unfiberized particles from the fiber particles prior to the formation of the fibers into insulation, and it is to this separation that the present invention pertains.

The blast furnace or other device for producing the slag is generally indicated by the numeral 1, the slag issuing therefrom through the conduit 2 and projected from the nozzle 3 thereof by a blast of gaseous medium under high pressure to create the subdivision of the slag into the fiber particles and the unfiberized particles above mentioned, the projection of such particles in the stream of gaseous medium being represented in Fig. 1 as forwardly divergent within substantially the limits of the dashed lines 4 and 5. Adjacent the nozzle 3 is erected the apparatus for separating the fibers from the unfiberized particles, such apparatus having the front wall 6 provided with the opening 7 through which such projection can be made, the floor of the apparatus being indicated at 8, the roof at 9 and the rear wall at 10. Within the structure defined by said walls there is provided a partition 11 of such character as to extend from the opening 7 to the roof 9, said partition adjacent said opening having the portion 12 substantially conforming to the upper limit (4) of the forwardly divergent stream of gaseous medium, and an upper portion 13 so formed as to direct the gaseous medium upwardly and forwardly in the direction of the arrows 14 to pass over the inner surface of the roof 9 as represented by the arrows 15 into the fiber settling chamber generally identified by the numeral 16.

A vertically extending baffle generally identified by the numeral 20 projects upwardly from the floor 8 at a location in advance of the upper portion 13 of the partition 11, said baffle lying in a plane transverse of the stream of gaseous medium, but the upper extremity 21 of such baffle is spaced from the roof 9 so that said stream will be directed curvilinearly up and over said baffle as indicated by the arrows 14 and 15 to reach the settling chamber 16. Preferably this baffle is inclined as indicated in the drawings upwardly and forwardly to assist in the generally forward movement of said stream through the apparatus, and the face of said baffle against which said steam impinges is provided with surface formations such as to intercept the unfiberized particles (globules or shot) and to deflect or direct them downwardly into a zone 22 of particle recovery. Such surface formations may be made as desired but in the drawings they have been illustrated as pairs of angularly arranged surfaces, one surface 23 of each pair disposed substantially coplanar with the moving stream, and the other surface 24 of each pair disposed in a plane transverse to the moving stream, whereby the unfiberized particles (shot) will impinge forcibly upon such transversely disposed surfaces 24 and be deflected therefrom in a downward direction as indicated by the short arrows 25, such impingement being with such force as to break the connection of such particles with their attached hair-like fibers, the unfiberized particles or shot having a weight due to their mass generally sufficient when separated from their attached fibers to be urged by the force of gravity downwardly, in addition to the downward directional movement imparted to them by the surfaces 24 of said baffle. These baffle surfaces or corrugations extend across the baffle from one vertical side thereof to the other and are provided on the baffle in the area of impingement of the gaseous stream thereon.

The stream of gesous medium comprising the fibers and unfiberized particles is confined within the apparatus adjacent the entrance 7 by the portion 12 of the partition 11 on the top, by the inwardly and forwardly divergent side partitions 30 and 31, and by a movable member on the bottom, the movable member preferably comprising an endless conveyor 32, the upper reach of which moves in a forward direction with said stream. Said conveyor extends from the forward wall 6 of the apparatus to a point closely adjacent the baffle 20 to leave a space therebetween constituting the throat of the zone 22 of particle recovery, there being provided a seal 33 between said front wall and said conveyor for effectively stopping any appreciable passage of gaseous medium through the space between said wall and said conveyor, and said seal may be of any suitable type such as a flap of flexible material such as rubber. The side partitions 30 and 31 have bottom edges 34 just clearing the upper reach of said conveyor so as to minimize any passage of gaseous medium under said sides.

As heretofore stated, the unfiberized particles or shot, whether independent of or attached to the fibers, have a mass materially greater than a fiber and/or a mass so unified with respect to a strung out or attenuated hair-like fiber, that such unfiberized particle or shot will be affected by the force of gravity to a much greater extent than the mass of a fiber, regardless of the particular velocity imparted by the moving stream of gaseous medium. This may be stated in more simple words thusly, the unfiberized particles will not all be of the same size, some being greater than others. Thus it will be appreciated that the larger shot may fall from the stream of gaseous medium before impinging upon the baffle 20 and this condition is indicated in the drawings by the downwardly curving arrows such as 35. For this reason the movable bottom wall or conveyor 32 is provided for receiving thereon such fallen shot and conveying them forwardly to the zone of shot recovery.

At the zone of shot recovery but disposed below the forward end of said conveyor, there is provided means for recovering the shot separated from the fibers, said means being any suitable mechanism such as an endless conveyor generally identified by the numeral 40 and provided with members such as flights 41 for insuring removal of the shot from the apparatus, such a conveyor being diagrammatically illustrated in Fig. 3 as extending transversely of the apparatus and mounted on suitable sprockets or rollers such as 42 disposed outside the chamber of the apparatus and driven in any suitable manner as by a motor generally indicated at 43, the side walls of said chamber being indicated at 44 and 45.

A second source of gaseous medium under pressure is provided at the zone 22 of shot recovery, preferably between the conveyor 40 and the upper conveyor 32, said gaseous medium being jetted in the direction of the arrow 46 from the conduit 47 and passing upwardly through the throat of the zone of shot recovery, and continuing upwardly in the direction of the arrows 48 transversely of the primary stream of gaseous medium heretofore mentioned, the two streams uniting across the face of the baffle, the second named stream augmenting the velocity of the fibers to insure their travel upwardly and over the top of the baffle. In other words the means for confining the primary stream of gaseous medium with its suspended substances, is one of definite cross-sectional area which progressively increases in the direction of movement of the suspended fibers and unfiberized particles (shot), such progressively increasing areas being due to the forwardly divergent nature of the top wall 12, the bottom conveyor wall 32, and the side walls 30 and 31 of the confining means, and therefore the velocity of the fibers is decreased while passing through the confining means so that it is desirable to provide the second source of gaseous medium at a velocity sufficient to cause the continued forward movement of the fibers through the apparatus. Such decrease of the velocity of the fibers in the primary stream induces a separation particularly of the independent fibers and the unfiberized particles, permitting the latter to drop by gravity on to the conveyor 32, and possibly some of the fibers still attached to unfiberized particles (shot) will also fall upon said conveyor and thus be carried to the zone of fiber recovery. The velocity of the auxiliary stream of gaseous medium from conduit 47 will be such as to break many of such attached fibers from their shot globules and to waft such broken off fibers upwardly to join the fibers of the primary stream, this action being in the nature of a washing to free the shot globules of their attached fibers. The number of fibers remaining in the zone 22 and falling on to the conveyor 40, will be relatively small and they, together with the recovered shot globules, may be charged into the blast furnace 1 for melting and reconversion into fibers and/or unfiberized particles.

The fiber settling chamber 16 is that part of the apparatus between the baffle 20 and the rear wall 10, and at the lower portion of this chamber there is provided an elongated conveyor 50 upon the upper reach of which the fibers will fall and build up to a desired thickness in the nature of a blanket, the speed of the endless conveyor being regulated in accordance with the desired thickness of such blanket. The deposition of the fibers on such conveyor is indicated by the arrows 51, and the blanket of fibers on the conveyor is indicated by the numeral 52. In case the blanket is desired compressed in thickness, one or more pressure rolls indicated at 53 may be provided preferably where the blanket leaves the apparatus. Suitable openings such as 54 and 55 may be provided in the wall 10 through which the continuous conveyor may pass, such openings being sealed in any suitable manner as by the flexible flaps indicated at 56, 57, 58 and 59. To assist in the deposition of the fibers and the formation of the blanket on said conveyor 50, there may be provided an opening 60 in a side wall of the chamber below the conveyor and connected to an exhaust device 61 of any suitable type and driven as by a motor 62. The conveyor may be of any suitable type though preferably permeable to assist in the laying up of the deposited fibers to form the blanket 52.

It will be obvious from the foregoing description that those skilled in the art may vary the details of construction and arrangements of parts constituting the apparatus, without departing from the spirit of this invention and therefore it is desired not to be limited to the exact foregoing disclosure except as may be required by the claims.

What is claimed is:

1. An apparatus comprising means for suspending fibers and unfiberized particles in a moving fluid stream, a fiber receiving chamber arranged to receive such stream, and a baffle disposed in said receiving chamber transversely of such stream, said baffle provided with a saw tooth like configuration comprising pairs of angularly arranged surfaces, one surface of each pair disposed substantially coplanar with the moving stream, the other surface of each pair disposed in a plane transverse to the moving stream for intercepting and deflecting such particles in a direction appreciably different from that of the moving stream.

2. An apparatus for making mineral wool comprising means for treating molten material to form fibers and unfiberized particles suspended in a moving gaseous medium, means for confining such gaseous medium and suspended substances to a definite cross-sectional area which progressively increases in the direction of movement of the suspension, to thereby decrease the velocity of the fibers and induce separation of the fibers and said particles, impact means for freeing fibers which are attached to such particles and comprising a plurality of separate and substantially parallel surfaces, each extending traversely across the path of flow of the gaseous fiber suspending medium and inclined angularly with respect to the path of flow of the moving gaseous medium prior to deflection by the interposed angular surfaces, the angularly inclined surfaces directed downwardly with respect to the said path of flow of the said moving gaseous medium and the said such downwardly directed angular surfaces substantially overlapping with respect to their projected areas and collectively deflecting the path of flow of the moving gaseous medium and fiberized particles suspended therein, means comprising a second moving gaseous medium directed substantially transversely to the principal direction of flow of the primary moving gaseous medium and forcibly propelling the fibers and particles to be separated against said impact means and augmenting the movement of all of the suspended fibers after the separation thereof from said particles, and means for recoving the separated fibers.

3. An apparatus for making mineral wool comprising means for treating molten material to form fibers and unfiberized particles suspended in a moving gaseous medium, means for confining such gaseous medium and suspended substances to a definite cross-sectional area which progressively increases in the direction of movement of the suspension, to thereby decrease the velocity of the fibers and induce separation of the fibers and said particles, impact means, interposed in the path thereof, provided with angular particle deflecting surfaces for freeing fibers which are attached to such particles, means for directing a second moving gaseous medium over said means comprising a second moving gaseous medium flowing adjacent the impact means and directed substantially transversely with respect to the primary directional movement of the first gaseous medium, the resultant thereof with the primary moving gaseous medium directing the particles against the deflecting surfaces of the impact means and augmenting the movement of all of the suspended fibers after the separation thereof from said particles, the directional movement of such second gaseous medium being not less than 45° to the directional movement of the first gaseous medium, and means for recovering the separated fibers.

4. An apparatus for making mineral wool comprising means for treating molten material to form fibers and unfiberized particles suspended in a stream of a moving gaseous medium, means for confining such stream of gaseous medium and suspended substances to a definite cross-sectional area which progressively increases in the direction of movement of the suspension, to thereby decrease the velocity of the fibers and induce separation of the fibers and said particles, said confining means comprising a wall movable in the direction of such stream of suspended substances for conveying particles separated from said fibers to a zone of particle recovery, impact means comprising downwardly deflecting angularly arranged surfaces disposed adjacent such zone of particle recovery for freeing particles which are attached to said fibers, said impact means directing such freed particles into such zone, means for augmenting the movement of the suspended fibers after the separation thereof from said particles, and means for recovering the separated fibers.

5. An apparatus for making mineral wool comprising means for treating molten material to form fibers and unfiberized particles suspended in a stream of a moving gaseous medium, walled means for conducting such stream of gaseous medium and suspended substances to a zone of particle recovery, said conducting means comprising a bottom wall movable in the direction of such stream of suspended substances for receiving and discharging particles separated from said fibers into such zone, impact means comprising downwardly angularly arranged surfaces disposed adjacent such zone for freeing particles which are attached to said fibers, said impact means deflecting such freed particles into such zone, a movable member in such zone for recovering such particles, and means for recovering the separated fibers.

6. An apparatus for making mineral wool comprising means for treating molten material to form fibers and unfiberized particles suspended in a stream of a moving gaseous medium, walled means for conducting such stream of gaseous medium and suspended substances to a zone of particle recovery, said conducting means comprising a bottom wall movable in the direction of such stream of suspended substances for receiving and discharging particles separated from said fibers into such zone, impact means comprising downwardly deflecting angularly arranged surfaces disposed adjacent such zone for freeing particles which are attached to said fibers, said impact means deflecting such freed particles into such zone, a conveyor for recovering such particles, said conveyor disposed intermediate said impact means and the bottom wall of said conducting means and arranged to receive the particles discharged from both, said conveyor operable in a direction transverse to the direction of such stream and means for recovering the separated fibers.

CARL G. MUENCH.